G. F. & T. M. GOUDY.

Sheep Rack.

No. 53,811.

Patented April 10, 1866.

WITNESSES

INVENTORS

UNITED STATES PATENT OFFICE.

G. F. GOUDY AND T. M. GOUDY, OF INDEPENDENCE, OHIO.

IMPROVEMENT IN SHEEP-RACKS.

Specification forming part of Letters Patent No. 53,811, dated April 10, 1866.

*To all whom it may concern:*

Be it known that we, G. F. GOUDY and T. M. GOUDY, of Independence, in the county of Cuyahoga and State of Ohio, have invented certain new and useful Improvements in Sheep-Racks; and we do hereby declare that the following is a full and complete description of the construction and operation of the same, reference being had to the accompanying drawings, making a part of this specification, in which—

Figure 1:
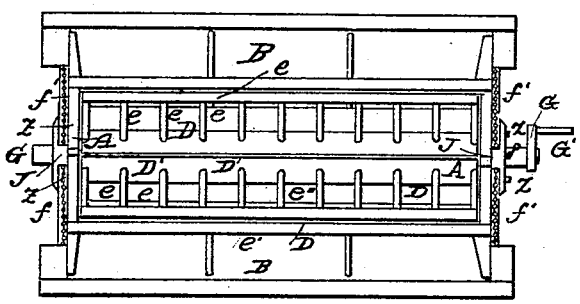
Figure 2:
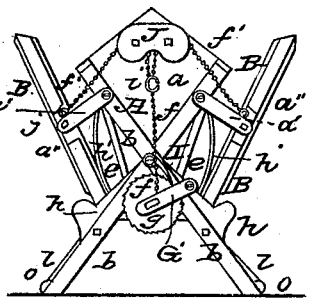
Figure 3:
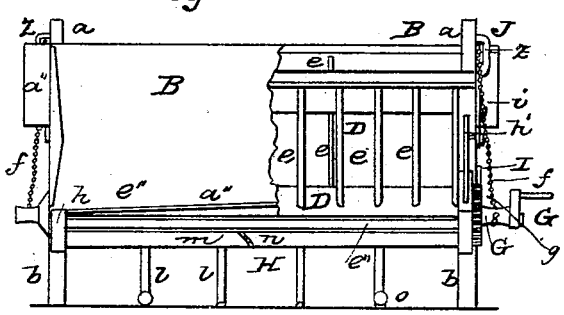
Figure 4:
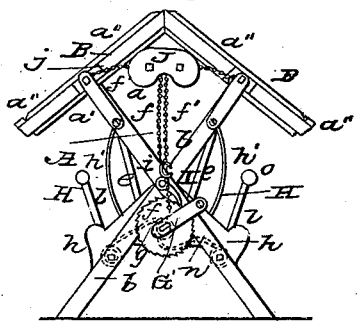

Figure 1 is a plan view of the rack. Fig. 2 is an end view. Fig. 3 is a side view with a part of the cover broken away. Fig. 4 is an end view with the cover in a different position from what it is in Fig. 2.

Like letters of reference refer to like parts in the different views.

Our improvement relates to a portable adjustable sheep-rack constructed and arranged as hereinafter described.

The ends A of the rack are formed of cross-pieces $b$, that cross each other, as represented in Figs. 2 and 4, the lower ends of which form legs or standards for supporting the rack, and between them at the top there is a piece, $a$, of the shape represented, closing the ends of the rack.

B B are adjustable covers on the sides, hung to the ends by arms or links $a'$, that are pivoted at each end to the covers and cross-pieces $b$, as represented.

The rack D is seen in Figs. 1 and 2, and consists of bars $e$, inserted at the lower ends in a frame, D′, from which they incline outward toward the top, and are secured in longitudinal pieces $e'$, extending between the ends. The frame D′ in the bottom of the rack is pointed on the top, from which it inclines outward on the sides, and at the lower edges troughs $e''$ are formed below the bars $e$ of the rack for feeding grain to the sheep and for catching seed, &c., that falls from the hay. On the cross-piece $b$ are secured lugs $h$, that the covers B rest upon when they are down on the sides, as seen in Fig. 2. Under the frame D′ there is a shaft, G, extending the whole length of the rack and beyond the ends A, in which it has its bearings. On this shaft, at one end, there is a ratchet-wheel, $g$, that a pawl, I, catches into, whereby the shaft is held stationary.

G′ is a crank-handle on one end of the shaft for turning it, and at each end of the shaft are attached chains $f$, placed at the upper ends on links $i$. On the upper part of these links are placed the ends of chains $f'$, that extend over pulleys Z and are attached to the arms $a'$ at $j$, near the ends where they are pivoted to the covers. The pulleys Z have their bearings in the ends of the rack and pieces J attached to the ends.

$h'$ $h'$ are curved guides, the ends of which are inserted in the cross-pieces. The covers B rest and move on these guides as they are carried up and down onto the lugs $h$.

H H are guards on each side of the rack, that consist of bars $l$, inserted in shafts $m$, which have their bearings in the end frames. There are weights $o$ on the ends of one or more of these bars to cause the guards to drop down readily when they are turned by the shaft G. The guards are turned up or down by means of cords or ropes $n$, that are attached to the shafts $m$ and center shaft, G, as indicated by the dotted lines in Fig. 4, so that as the shaft G is turned it wraps the cords around the shaft, which draws up the guards into the position shown in Fig. 4, and by reversing the motion of the shaft the cords are released, letting down the guards, as represented in Figs. 2 and 3. This is done simultaneously with changing the position of the covers B, for when the covers are down on the sides, as in Figs. 1, 2, and 3, the guards being also down, by turning the crank G′ the chains $f$ are wrapped around the shaft G, drawing down the chains $f'$ over the pulleys Z, turning up the arms $a'$, as in Fig. 4, when the covers will be raised up over the top of the rack, coming close together at the upper edges, forming a roof, as shown in Fig. 4. This motion of the shaft turns up at the same time the guards H, when the pawl I, catching into the ratchet-wheel, prevents the shaft from turning back and retains the covers and guards in that position.

When it is desired to let down the covers, by raising the pawl and reversing the motion of the shaft the covers and guards will be lowered into the position seen in Figs. 1, 2, and 3. The rack D can then be filled with hay and fodder for the sheep, or grain can be thrown in, that will run down into the troughs $e''$.

The sheep cannot get at the feed when the covers are down, so that it may be put in at any time; but when it is desired that they shall feed, the covers and guards are raised, when the sheep can gain access to the rack and troughs on both sides.

The guards H are to prevent the sheep from crowding against each other, the strong crowding or pushing out the weaker ones, so that all can have the same access to the feed.

The covers B protect the sheep from the storm and weather when they are eating. There are ribs $a''$ at each end and at the lower edges of the covers for carrying off the rain at the corners and preventing it from running onto the sheep.

This rack is portable, can readily be moved from place to place, which is very desirable in taking good care of sheep, that the place where they stand and eat may be always neat and clean, and it is adjustable. Their food can be put in the rack at any time. It is covered up when they are eating, and the weak sheep are guarded from being pushed by the stronger ones, as herein described.

What we claim as our improvement, and desire to secure by Letters Patent, is—

1. The adjustable covers B, arms or links $a'$, and chains $ff'$, in combination with the shaft G and rack, substantially as and for the purpose set forth.

2. In combination with the above, the adjustable guards H and cords $n$, substantially as and for the purpose set forth.

G. F. GOUDY.
T. M. GOUDY.

Witnesses:
W. H. BURRIDGE,
A. W. McCLELLAND.